May 30, 1944.　　　　D. B. HYDE　　　　2,349,868
BIRD FEEDER
Filed Aug. 21, 1942　　　　2 Sheets-Sheet 1

Inventor:
Donald B. Hyde,
by Thomson & Thomson
Attorneys

May 30, 1944.　　　D. B. HYDE　　　2,349,868
BIRD FEEDER
Filed Aug. 21, 1942　　　2 Sheets-Sheet 2

Inventor:
Donald B. Hyde,
by Thomson & Thomson
Attorneys

Patented May 30, 1944

2,349,868

UNITED STATES PATENT OFFICE 2,349,868

BIRD FEEDER

Donald B. Hyde, Newton, Mass.

Application April 21, 1942, Serial No. 439,807

4 Claims. (Cl. 119—51)

This invention relates to improvements in bird feeders, particularly of the revolving type which are known as weathervane feeders.

It is old to make bird feeding stations in the form of houses and to make such bird feeders with vanes which cause the bird feeder to turn towards the wind.

It is an object of the present invention to provide a weathervane bird feeder in which the vanes are arranged beneath the floor of the feeder and within the area of the roof of the feeder thereby making the feeder more compact and preserving the attractive appearance of the feeder.

It is further an object of my invention to provide a bird feeder in the form of a house which is open on only one side, and to provide vanes which cause the feeder to turn into the wind with the open side away from the wind, the vanes being mounted immediately beneath the floor of the bird feeder whereby the vanes are more securely fixed in position, making the feeder more compact, and the vanes are so arranged that they do not detract from the attractive design of the feeder as a whole.

It is further an object of my invention to make a bird feeder comprising a house consisting of a floor, vertical sides and a roof, with a glassed front, the floor being spaced inwardly from the open rear end of the feeder, the feeder having a pair of weathervanes fixed to the under side of the floor and mounted to turn on a dowel post which passes through the floor of the feeder.

Further objects and advantages of my improvements will be more readily apparent from the following description of a preferred embodiment thereof as illustrated in the attached drawings, in which.

Figure 1:
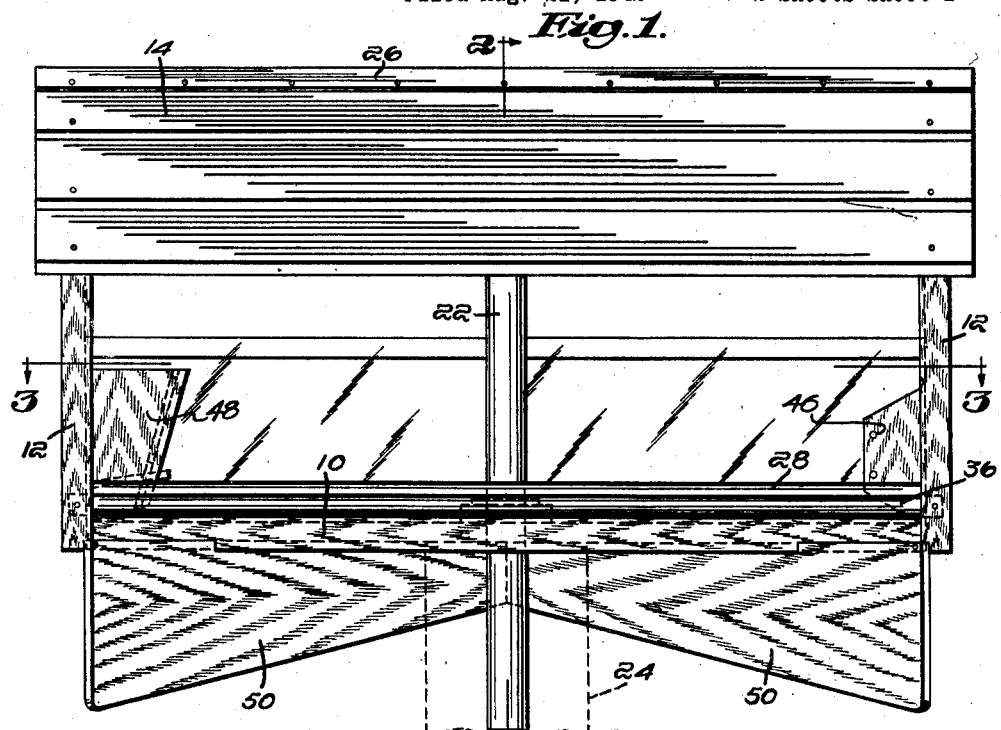
Fig. 1 is a rear elevation of the bird feeding house, a post support therefor being shown in dotted lines.

The bird feeding device disclosed herein is in the form of a house comprising the floor 10, the vertical sides 12—12, and the pitched roof 14. The front end is closed by a glass window 16. The rear end is open to allow the birds to enter. The roof is braced on the inside by a horizontal partition 18 provided with a socket bearing 20 for the upper end of a dowel post 22 which mounts the bird feeding device by fitting in the top of a post 24 or by being fixed thereto in any convenient manner. The bird house is free to turn with respect to the dowel post 22.

Figure 2:
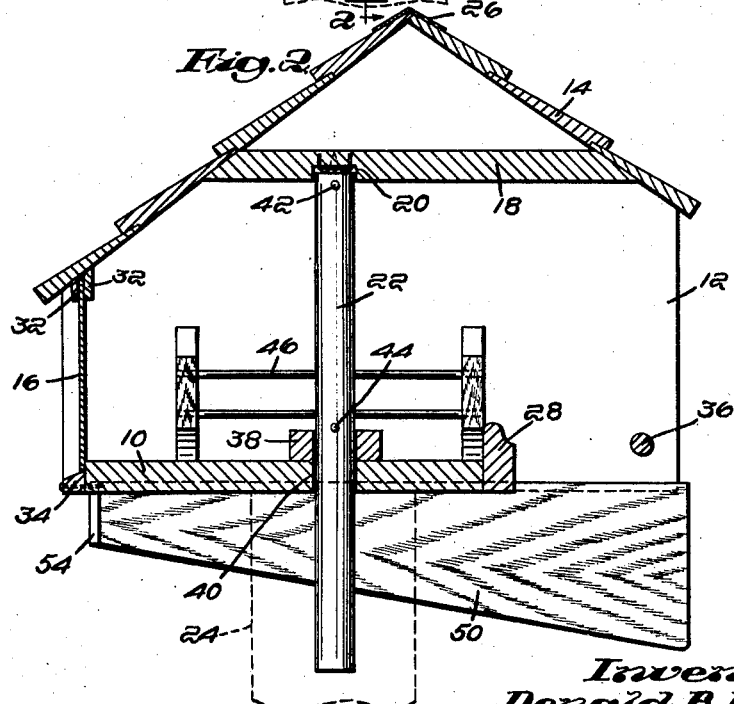
Fig. 2 is a vertical section taken on the plane indicated by the line 2—2 in Fig. 1.
Figure 3:
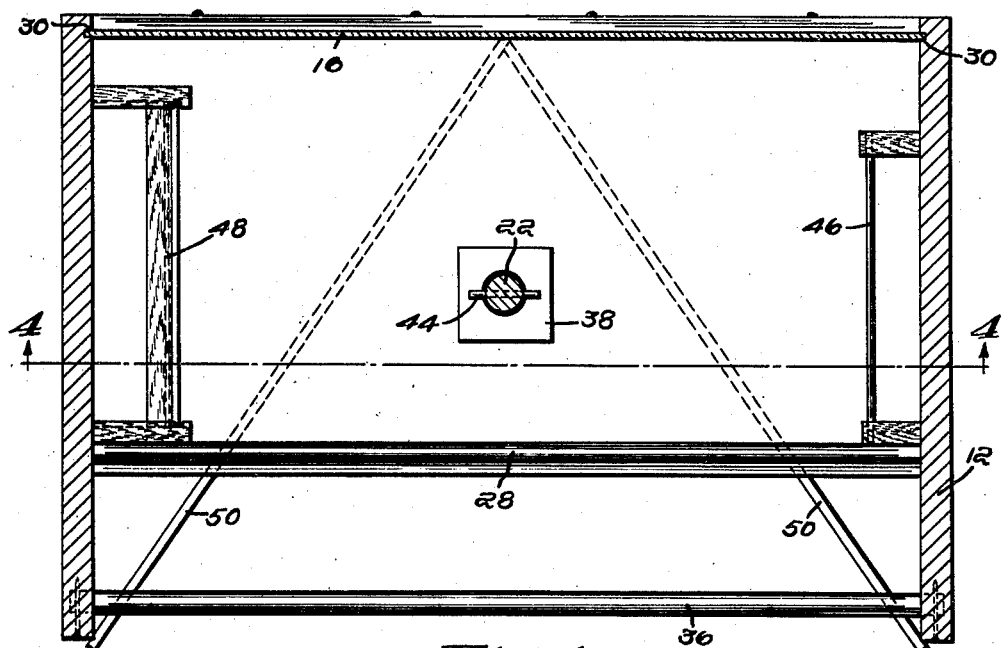
Fig. 3 is a horizontal section taken on the plane indicated by the line 3—3 in Fig. 1.
Figure 4:
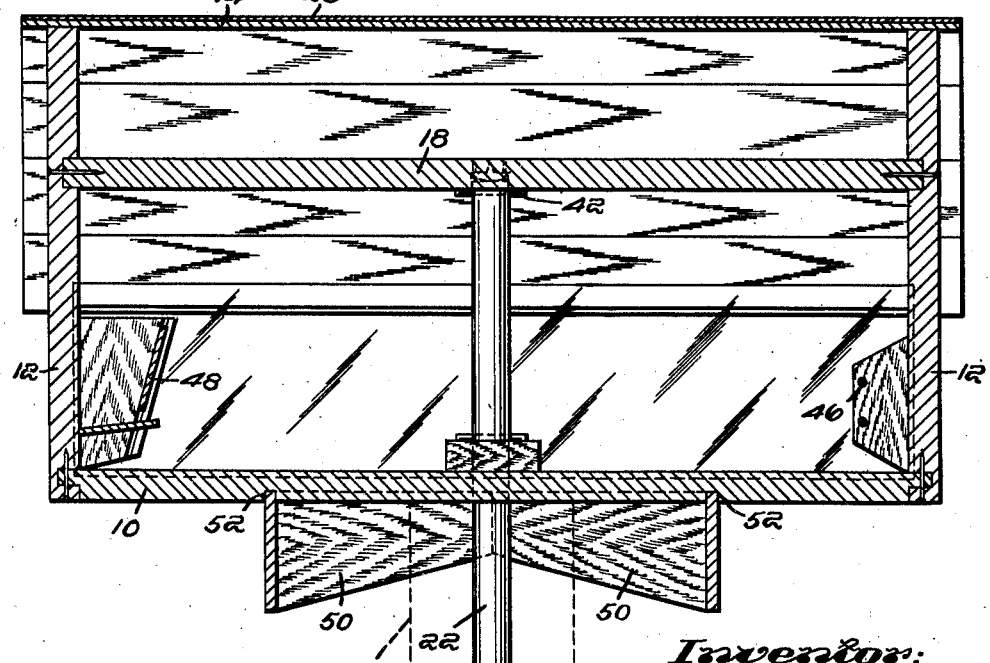
Fig. 4 is a vertical section taken on the plane indicated by the line 4—4 in Fig. 3.

In the particular embodiment, the pitch of the front part of the roof 14 is sharper than the rear portion and the ridge 26 is offset rearwardly with respect to the axis of the post 22, but various designs of the roof could be used. The floor 10 extends forwardly to the front window 16 but at its rear end terminates short of the ends of the sides 12 and the roof 14 as shown in Fig. 2. The floor 10 at the rear end has fixed thereto a molding strip 28 which extends above the level of the floor. The window 16 is securely held in place by being fitted at its side edges into grooves 30 cut in the vertical sides 12. The upper edge of the glass window 16 is confined between the strips 32 and the bottom edge of the glass is held by the framing strip 34. The front of the bird feeding device is therefore made substantially weather-tight.

At the rear open end a transverse rod 36 extends between the side walls 12 and forms a perch for the birds as they enter the house. The supporting post 22 passes through a block 38 and an opening 40 in the floor 10. The house is held against separation from the post 22 by the provision of a cross-pin 42 adjacent the upper end of the post 22 and a cross-pin 44 immediately above the block 38 which is attached to the floor of the house. The block 38 is so arranged that loose seeds on the floor of the house will not fall into the opening 40 between the floor 10 and the post 22 and thereby cause binding preventing the bird house from turning with respect to the post 22.

The interior of the house may be provided with a rack 46 fixed to one side wall 12 to receive a cake of bird food, while the opposite side wall may have fixed thereto a hopper 48 adapted to receive loose bird seed.

The bird feeding house is designed to serve as a weathervane, particularly to keep the closed front end headed into the wind thereby preventing snow from accumulating in the interior of the bird house and keeping the interior of the house dry in rain storms. Snow and rain are also prevented from reaching the interior of the house by having the floor spaced inwardly from the open end as shown in Fig. 2. The bird house is caused to turn with the wind by the provision of the pair of vanes 50 arranged in the form of a V and fixed to the underside of the floor 10 by fitting into the grooves 52 formed in the floor 10. The vanes 50 taper towards their front ends 54 which meet to form the point of the V. The rear ends 56 terminate adjacent the rear ends of the side walls 12. Thus, the vanes 50 are confined within the area of the roof 14. Since the surface of the bird house and of the vanes 50 rearwardly of the axis of the post 22 is materially more than the corresponding areas forwardly of the post 22, the bird house will be swung by the wind with the front end and the point of the V of the vanes 50 pointing towards the wind.

The requirements for an outside bird feeder are essentially, first, that the feeder will attract and not frighten away the birds; second, that the bird feeding area will be readily visible so that an observer may watch the birds using the feeder; and third, that the feeder is attractive in design and will fit into the general surroundings. The feeder herein disclosed will satisfy these requirements and it should be particularly noted that the proportions of the house and the vanes and the distribution of weight is so arranged that the feeder will move only slightly in response to wind pressure and therefore will not frighten birds away due to constant movement. Furthermore, the feeding area is large enough to attract a number of birds at the same time whereas if the house is designed itself to act as a weathervane without the provision of other vanes, such as in triangular form, the effective area is so reduced that such feeders do not prove as efficient in use.

In constructing a weathervane feeder it is important that the vanes be so arranged that they do not obstruct vision of the interior of the feeder. By locating the vanes beneath the feeder as shown, the feeding area is fully visible. By providing a pair of vanes arranged in a V, the effective vane area may be kept within reasonable proportions and yet will be so arranged that the wind will strike the vanes and turn the feeder no matter from what direction the wind is blowing thus avoiding dead centers. The vanes by being disposed beneath the house will not detract from the appearance thereof and are securely held against possible damage or breakage such as may occur where the vanes extend laterally from the bird house and are secured only at one end.

It is also important that the feeder is so designed that it will keep dry under all weather conditions and therefore will be used more by the birds than if snow or rain is permitted to enter the feeder.

I claim:

1. A weathervane bird feeder in the shape of a house comprising a platform floor, vertical side walls extending beyond said floor at the rear edge thereof, a roof fixed to said side walls and extending the full length of said side walls, a window closing the front of the bird house, the rear of the bird house being open to allow the birds to enter the house, means for retaining a supply of bird feed within the interior of the bird house, a fixed vertical post, said house being mounted for relative rotation with respect to said post by having an opening in the floor of said house to receive the post and a socket bearing in the roof of the house to engage the upper end of the post, and a pair of wind vanes fixed to the underside of said floor and extending from the rear lower corners of said side walls to a point at the middle of the front edge of said floor, said wind vanes being flared vertically from the front ends to the rear end thereof and being so arranged that the wind will cause the bird house to turn with the open side thereof facing away from the wind.

2. A weathervane bird feeder in the shape of a house comprising a rectangular floor, a pair of vertical side walls attached to the side edges of the floor and extending rearwardly beyond the rear edge of the floor, a pitch roof attached to the side walls and extending rearwardly beyond the rear edge of the floor, a window closing the front end of the house, a pair of vanes arranged in the shape of a V, said vanes being fixed on the under side of the floor and extending rearwardly beyond the floor to the rear ends of the side walls, and means for mounting the house for rotation whereby the wind acting upon the vane will turn the house with the open side thereof facing away from the wind, the extension of the roof beyond the rear edge of the floor tending to prevent rain and snow from collecting on the floor of the house.

3. A weathervane bird feeder in the shape of a house comprising a rectangular floor, vertical side walls, a pitch roof, a window closing the front end of the house, a pair of vanes fixed to the under side of the floor, said vanes being arranged in the shape of a V with the point of the V at the front of the house, said side walls, roof and vanes extending rearwardly beyond the rear edge of the floor to prevent rain and snow from entering the house, a vertical post extending through the floor of the house, and means for supporting the house for rotation with respect to the post comprising a pivot bearing by which the house rests on the top of the post, said pivot bearing being positioned beneath the roof of the house.

4. A weathervane bird feeder in the shape of a house comprising a floor, vertical side walls extending beyond said floor at the rear edge thereof, a roof fixed to said side walls and extending rearwardly beyond the rear edge of said floor, the front of the bird house being closed and the rear being open to allow the birds to enter the house, a vertical post, said house being mounted for relative rotation by said post, a pair of wind vanes fixed to the under side of said floor and extending from the rear lower corners of said side walls to a point at the middle of the front edge of said floor, said wind vanes being flared vertically from the front end to the rear ends thereof, and being so arranged that the wind will cause the bird house to turn with the open side thereof facing away from the wind.

DONALD B. HYDE.